United States Patent
Inniss et al.

(10) Patent No.: US 9,481,253 B2
(45) Date of Patent: Nov. 1, 2016

(54) ELECTRICAL ENERGY STORAGE SYSTEM FOR TRACTION POWER SUPPLY

(75) Inventors: Brian Inniss, Dollard des Ormeaux (CA); Omar Messas, LaSalle (CA)

(73) Assignee: ABB Inc., St. Laurent, Quebec (CA)

(*) Notice: Subject to any disclaimer, the term of this patent is extended or adjusted under 35 U.S.C. 154(b) by 207 days.

(21) Appl. No.: 14/236,592

(22) PCT Filed: Aug. 3, 2012

(86) PCT No.: PCT/CA2012/000733
§ 371 (c)(1),
(2), (4) Date: Mar. 13, 2014

(87) PCT Pub. No.: WO2013/020212
PCT Pub. Date: Feb. 14, 2013

(65) Prior Publication Data
US 2014/0239856 A1    Aug. 28, 2014

Related U.S. Application Data

(60) Provisional application No. 61/573,016, filed on Aug. 5, 2011.

(51) Int. Cl.
*H02P 1/00* (2006.01)
*B60L 11/18* (2006.01)
(Continued)

(52) U.S. Cl.
CPC .......... *B60L 11/1801* (2013.01); *B60L 3/0046* (2013.01); *B60L 7/16* (2013.01);
(Continued)

(58) Field of Classification Search
CPC .. H02M 3/00; H02M 3/1582; H02M 3/1584; H02P 2201/09; H02P 2201/11; H02P 3/14
USPC .................................................. 318/139, 376
See application file for complete search history.

(56) References Cited

U.S. PATENT DOCUMENTS 7,817,452 B2 * 10/2010 Smith ............... H02M 3/33569
363/132
2005/0151513 A1 * 7/2005 Cook .................... H02J 7/1423
320/137

(Continued)

FOREIGN PATENT DOCUMENTS

| CN | 1974285 | 12/2006 |
|---|---|---|
| CN | 101186185 | 12/2007 |

(Continued)

OTHER PUBLICATIONS

Patrick Abou-Antoun, The International Search Report, Oct. 22, 2012, ISA/CA Canadian Intellectual Property Office, Gatineau, Quebec K1A 0C9.

(Continued)

*Primary Examiner* — Eduardo Colon Santana
*Assistant Examiner* — Bickey Dhakal
(74) *Attorney, Agent, or Firm* — Taft Stettinius & Hollister LLP

(57) ABSTRACT

An energy storage system for connection to a traction power supply that provides power to an electric vehicle. The energy storage system includes a power controller that controls a DC-DC converter to transfer electrical energy from the traction power supply to electrical energy storage when the train is braking. The power controller also controls the converter to transfer electrical energy from the electrical energy storage to the traction power supply when the train is accelerating. The controller slows the rate of energy transfer when upper and lower voltage boundary limits of the electrical energy storage are approached, respectively.

20 Claims, 5 Drawing Sheets

(51) Int. Cl.
*B60L 7/16* (2006.01)
*H02J 7/34* (2006.01)
*B60L 3/00* (2006.01)
*B60L 7/22* (2006.01)
*B60L 9/30* (2006.01)
*B60L 11/00* (2006.01)

(52) U.S. Cl.
CPC ...... *B60L 7/22* (2013.01); *B60L 9/30* (2013.01); *B60L 11/005* (2013.01); *B60L 11/1859* (2013.01); *B60L 11/1862* (2013.01); *H02J 7/345* (2013.01); *B60L 2200/26* (2013.01); *B60L 2210/10* (2013.01); *B60L 2240/26* (2013.01); *B60L 2240/427* (2013.01); *B60L 2240/527* (2013.01); *B60L 2240/529* (2013.01); *B60L 2240/547* (2013.01); *B60L 2260/42* (2013.01); *Y02T 10/642* (2013.01); *Y02T 10/705* (2013.01); *Y02T 10/7005* (2013.01); *Y02T 10/7011* (2013.01); *Y02T 10/7022* (2013.01); *Y02T 10/7044* (2013.01); *Y02T 10/7216* (2013.01)

(56) References Cited

U.S. PATENT DOCUMENTS

| | | |
|---|---|---|
| 2009/0212626 A1 | 8/2009 | Snyder et al. |
| 2010/0192788 A1* | 8/2010 | Tanaka .................. H02M 1/36 100/214 |
| 2010/0259210 A1* | 10/2010 | Sasaki ..................... F03D 9/003 320/101 |
| 2011/0100735 A1 | 5/2011 | Flett |
| 2011/0187183 A1* | 8/2011 | Kimura ................. B60L 11/005 307/9.1 |
| 2012/0016547 A1* | 1/2012 | Aridome ............... B60K 6/365 701/22 |

FOREIGN PATENT DOCUMENTS

| | | | |
|---|---|---|---|
| EP | 2011685 | 1/2009 | |
| JP | 2003199204 | 7/2003 | |
| JP | 2005328618 | 11/2005 | |
| JP | 2006014395 | 1/2006 | |
| JP | 2006087299 | 3/2006 | |
| JP | WO 2010100736 A1 * | 9/2010 | ............ B60K 6/365 |
| JP | 20010252617 | 11/2010 | |
| WO | 2013020212 A1 | 2/2013 | |

OTHER PUBLICATIONS

Patrick Abou-Antoun, The Written Opinion of the International Searching Authority, Oct. 28, 2012, ISA/CA Canadian Intellectual Property Office, Gatineau, Quebec K1A 0C9.

Supplementary European Search Report, EP Appln. No. 12821386.5, Dated Nov. 6, 2015, 3 pgs.

* cited by examiner

ELECTRICAL ENERGY STORAGE SYSTEM FOR TRACTION POWER SUPPLY

BACKGROUND OF THE INVENTION

The present invention relates to an electrical energy storage system for traction power supplies, and more particularly to a system used to capture excess power detected on a traction power supply (as a braking recuperation system) and/or release some power to the traction power supply when power is in demand (as an acceleration assist system).

It is known in the art to provide an electrical energy storage system (ESS) to assist regulating the traction power supply (TPS) of a light rail network or the like using electric dual layer capacitors (EDLC) commonly called 'super capacitors' connected via a bi-directional DC-DC converter power supply. However, such ESSs have limited capabilities to take advantage of the full storage capacity of the different EDLCs due to the rapidity of the high voltage direct current (HVDC) transfer required as well as the management of any abrupt power transfer rate due to the ESS storage bank approaching an upper or lower boundary voltage condition. When the TPS voltage falls below an acceptable low voltage threshold, it is essential that the ESS can provide the required additional power to the TPS, and reversely, when the TPS voltage exceeds an acceptable high voltage threshold, it is essential that the ESS can recuperate the excess of power on the TPS line as quickly as possible, considering that excess energy found in the TPS (at a voltage level above the upper threshold) is typically directed to a load for elimination thereof in heat by the TPS itself.

Accordingly, there is a need for an improved electrical energy storage system.

SUMMARY OF THE INVENTION

In accordance with the present invention, an energy storage system is provided for connection to a traction power supply that provides power to an electric vehicle. The energy storage system includes a buck-boost DC-DC converter for connection to the traction power supply, electrical energy storage, a storage bus connecting the electrical energy storage to the converter, and a power controller communicably connected to the converter. The power controller operates in a regeneration mode when the vehicle is braking and in an assist mode when the vehicle is accelerating. When the power controller is in the regeneration mode, the power controller controls the converter to transfer electrical energy from the traction power supply to the electrical energy storage. When the power controller is in the assist mode, the power controller controls the converter to transfer electrical energy from the electrical energy storage to the traction power supply. The controller slows the rate of electrical energy transfer between the traction power supply and the electrical energy storage when upper and lower voltage boundary limits of the electrical energy storage are approached, respectively

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
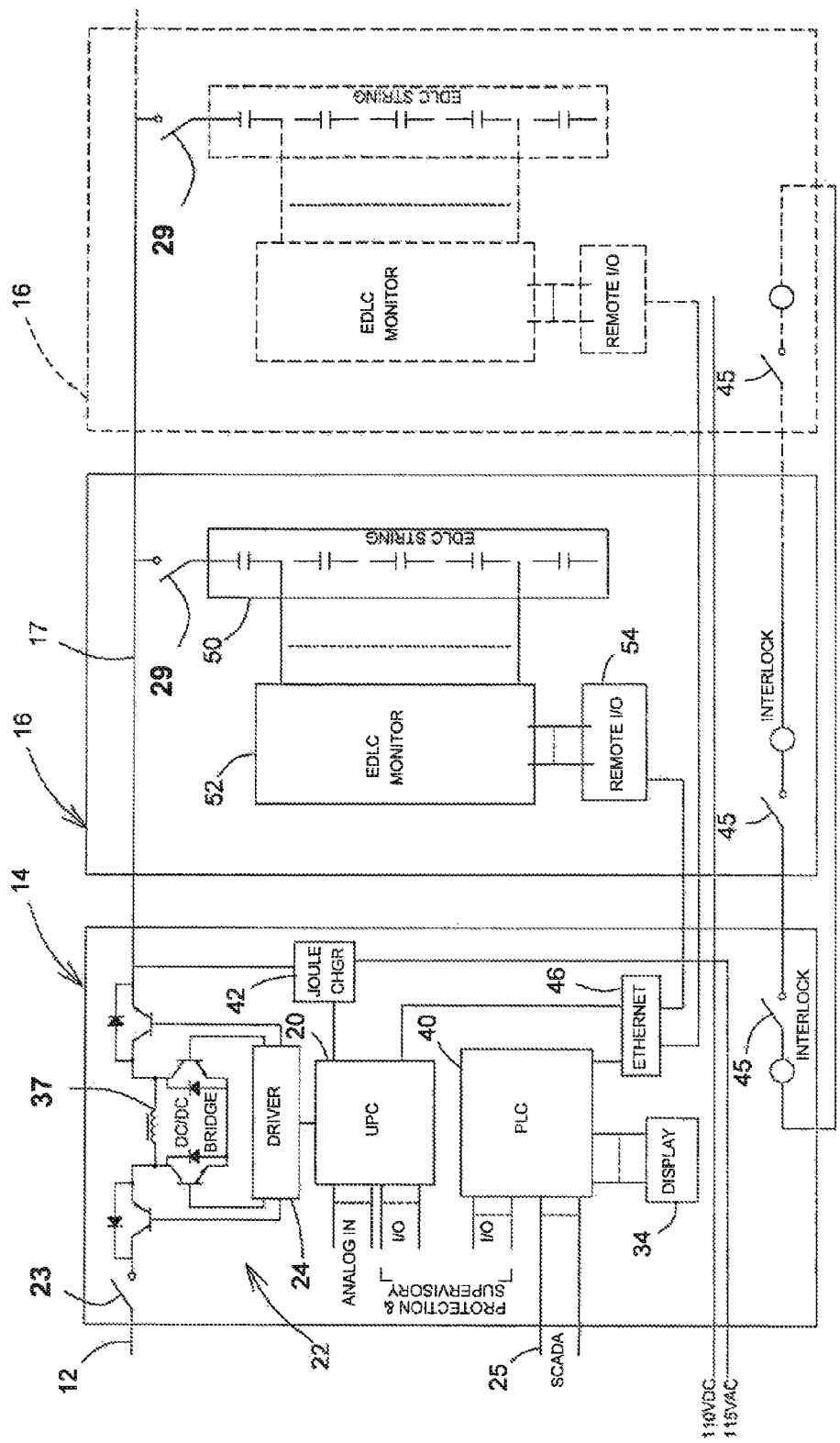
FIG. 1 is a schematic view of an energy storage system in accordance with an embodiment of the present invention for use with a traction power supply of a light rail network.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, there is shown an electrical energy storage system (ESS) 10 constructed in accordance with an embodiment of the present invention. The ESS 10 is for use with a traction power supply 12 that provides power to electric motors of a train. The ESS 10 is operable to stabilize the DC voltage of the traction power supply 12 when the train is accelerating and when the train is braking. When the train is accelerating, the ESS 10 is in an assist mode, wherein it provides power to the traction power supply 12. When the train is braking, the ESS 10 is in a regeneration mode, wherein it recovers energy from the traction power supply 12 and stores it for later use when the ESS 10 is in the assist mode.

The ESS 10 system includes a bi-directional DC-DC power converter unit 14 electrically connected to at least one energy storage unit 16 by a storage bus 17. The power converter unit 14 is electrically connected to the traction power supply 12 to transfer electrical energy between the traction power supply 12 and the electrical energy storage unit(s) 16. When a plurality of energy storage units 16 are connected to a power converter unit 14, they are connected in parallel, as shown in FIG. 1, with the second energy storage unit 16 shown in dashed lines. The number of energy storage units 16 connected to a power converter unit 14 generally depends on the maximum energy transfer that the power converter unit 14 can handle at the voltage ($V_{TPS}$) of the traction power supply 12. Each energy storage unit 16 includes electrical storage 50, such as electric double layer capacitors (EDLC), which are commonly referred to as "supercapacitors".

As described above, the power converter unit 14 is operable at different times to: (i) recover braking energy from the traction power supply 12 and store it in the energy storage unit(s) 16, and (ii.) assist the traction power supply 12 during peak demands using energy stored in the energy storage unit(s) 16. The direction of current flow of the power converter unit 14 (whether assisting or recovering) is controlled by the switching pattern of a bi-directional buck/boost DC-DC converter 22 controlled by a universal power controller 20 via a bridge driver 24. The converter 22 comprises a plurality of insulated gate bipolar transistors (IGBTs) arranged in a switching bridge.

The power converter unit 14 has interfaces for connection to the traction power supply 12 and energy storage unit(s) 16, respectively, to permit high voltage direct current (HVDC) traction power to flow between the power converter unit 14 and the traction power supply 12 and between the power converter unit 14 and the energy storage unit(s) 16. The power converter unit 14 also has interfaces for connection to sources of 100 VDC power and 115 VAC power, or if outside of North America, 200 VDC power and 230 VAC power. Further, the power converter unit 14 has communication interfaces for communicating with the energy storage unit(s) 16 and remotely located monitoring and/or control systems. One such communication interface may be a SCADA (supervisory control and data acquisition) interface 25, which may be connected to a remote monitoring and/or control system. Another communication interface may be an Ethernet interface, which may be connected to the energy storage unit(s) 16 for communication via the transmission control protocol (TCP).

Figure 2:
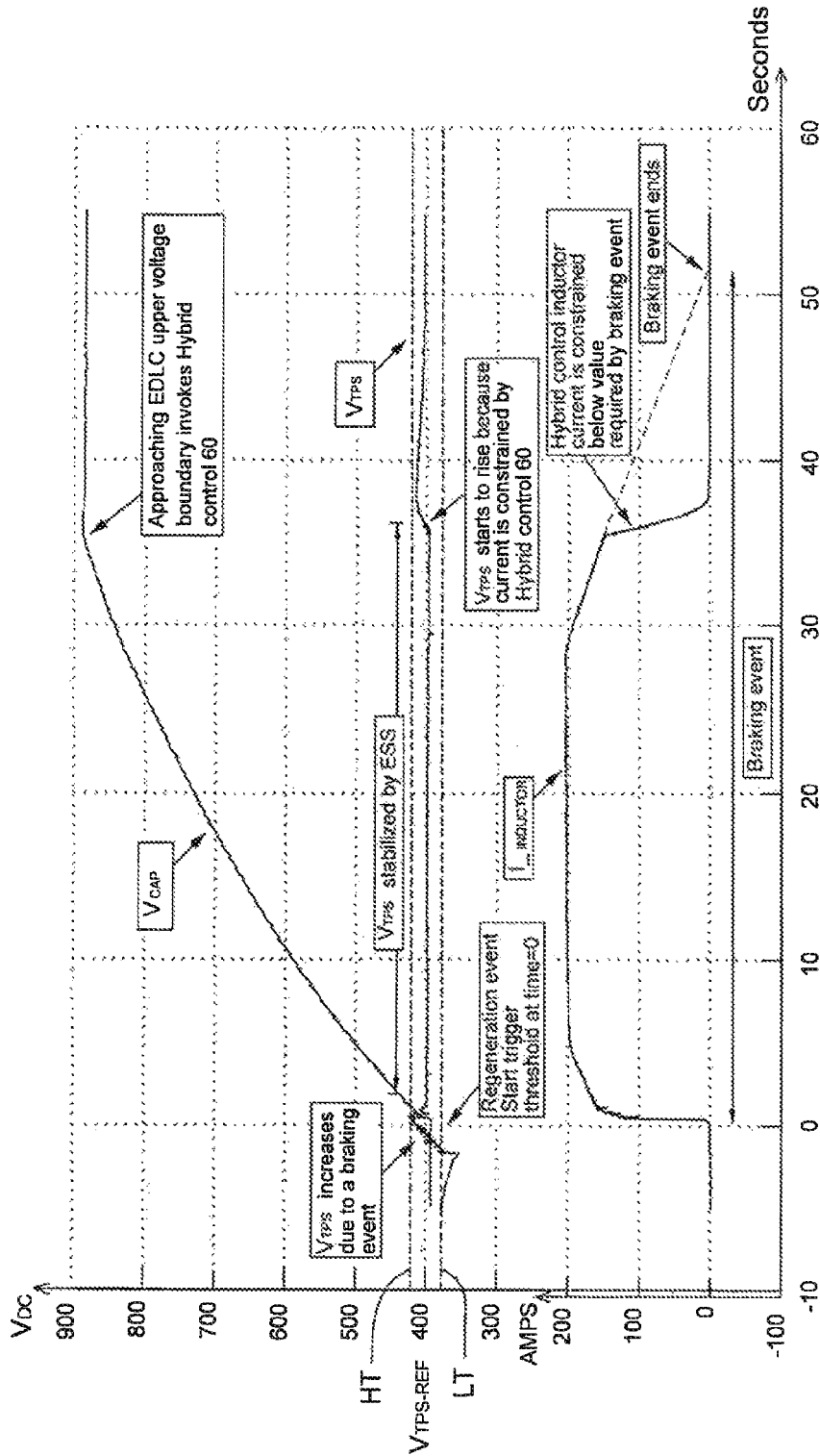
FIG. 2 is a schematic graphical representation of a traction power supply voltage profile being stabilized by the energy storage system of FIG. 1, during a braking event, with the energy storage system in a regeneration mode.
Figure 3:
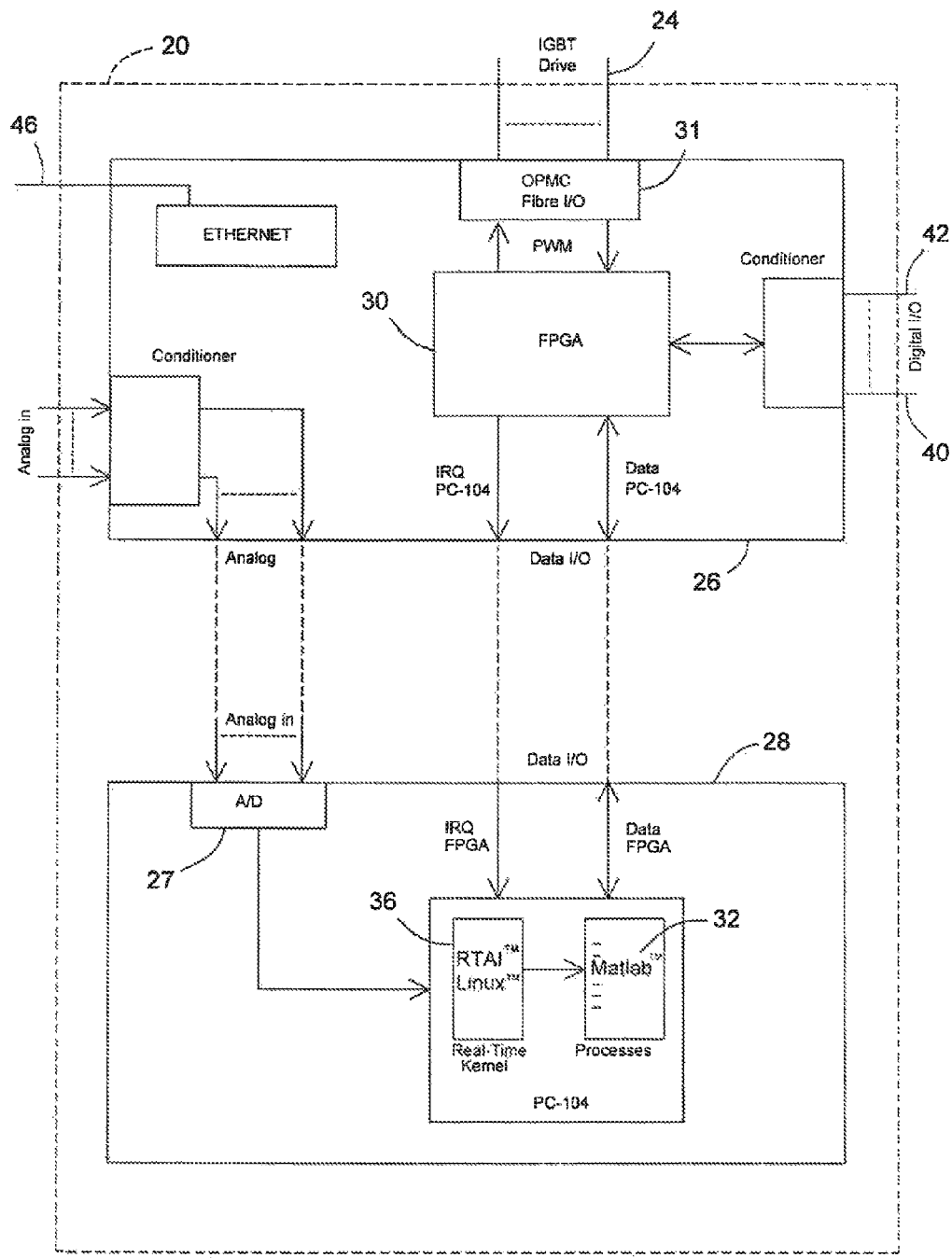
FIG. 3 is a schematic diagram of a universal power controller of the energy storage system of FIG. 1.

As shown in FIG. 2, the ESS 10 helps maintain the operating voltage ($V_{TPS}$) in the traction power supply 12 to be within acceptable preset low LT and high HT voltage threshold levels that are below and above a reference voltage level $V_{TPS-REF}$ of the traction power supply 12. The traction power supply 12 typically may have a voltage level $V_{TPS-REF}$ of 600 VDC, 750 VDC, 1500 VDC or 3000 VDC. For purposes of illustration only, $V_{TPS-REF}$ is shown in FIG. 2 as being 400 VDC.

Like the ESS 10 as a whole, the universal power controller 20 of the power converter unit 14 operates in a regeneration mode when the train slows down and in an assist mode when the train accelerates. The universal power controller 20 switches between the regeneration and assist modes automatically based on the voltage ($V_{TPS}$) of the traction power supply 12. More specifically, when the voltage ($V_{TPS}$) rises above the HT voltage threshold level, the universal controller 20 enters the regeneration mode and when the ($V_{TPS}$) falls below the LT voltage threshold level, the universal controller 20 enters the assist mode. In the regeneration mode, the universal power controller 20 controls the converter 22 to recover and store excess energy from the traction power supply 12 when the train slows down or brakes (as depicted in FIG. 2) and, as a result, the voltage level of the traction power supply 12 exceeds the high threshold HT. The recovered energy is stored in the energy storage unit(s) 16. In the assist mode, the universal power controller 20 controls the converter 22 to provide electrical energy from the energy storage unit(s) 16 to the traction power supply 12 when the train accelerates and the voltage level of the traction power supply 12 drops below the low threshold LT.

As described above, the universal power controller 20 controls the converter 22 through a driver 24. In addition, the universal power controller 20 controls connector switches 23, 29. The universal power controller 20 includes a mother board 26 and a computing unit stack 28, which typically includes a PC-104 printed circuit board having a processor for running applications, including a control application 32, which may be a Matlab™ application. The applications are stored in memory on the PC-104.

The mother board 26 conditions signals received from and provided to the computing unit stack 28. For example, the mother board 26 receives analog signals, conditions them and provides them to an analog-to-digital (A/D) converter 27 in the computing unit stack 28, which digitizes the signals and provides them to applications running on the processor of the PC-104. In addition, a field-programmable gate array (FPGA) 30 of the mother board 26 converts count data generated by the control application 32 into pulse-width modulated (PWM) signals. These PWM signals are, in turn, converted into light pulses by a fiber optic data module 31 for transmittance over fiber optic lines to the bridge driver 24. The FPGA 32 is programmed with very-high-speed integrated circuit (VHSIC) hardware description language (VHDL).

The computing unit stack 28 controls the energy storage unit(s) 16 and converter 22. The computing unit stack 28 also monitors the operation of the energy storage unit(s) 16 and the converter 22 and performs data logging. These control, monitoring and data logging functions are performed by applications (such as the application 32) running in a Linux™ operating system on the processor of the PC-104. The applications may advantageously use a real time application interface (RTAI) kernel 36.

The converter 22 is operable to convert the voltage ($V_{TPS}$) of the traction power supply 12 (which is typically in a range of from about 350 VDC to about 450 VDC) to the voltage ($V_{CAP}$) of the storage bus 17 (which is in a range of from about 500 VDC to about 1000 VDC). The voltage $V_{CAP}$ of the storage bus 17 is determined by the number of series connected capacitors in each energy storage unit 16.

As described above, the converter 22 comprises four IGBT switches arranged in a bridge. The converter 22 typically operates at a 1 kHz switching frequency. The gating sequence of the IGBT switches determines the direction of the converter current (assist or regeneration mode) and whether the converter 22 is in buck or boost mode (as described hereinafter). The gating sequence is generated by the universal power controller 20 in response to the bus voltage ($V_{TPS}$) of the traction power supply 12 and the voltage ($V_{CAP}$) of the storage bus 17.

The power converter unit 14 also includes a programmable logic controller (PLC) 40, which is connected to the universal power controller 20 through a communication module 46, which may be Ethernet-based. The PLC 40 controls TCP communication (which may be MODBUS™ on Ethernet protocol) within the ESS 10. The PLC 40 receives status and control signals from other devices located inside and outside of the power converter unit 14. Further, the PLC 40 generates status outputs that are sent to a display 34 for providing visual indications to a user. The display 34 may be comprised of LEDs or may be a graphical user interface.

The power converter unit 14 further includes a high voltage power supply 42, which is connected to the storage bus 17. The power supply 42 is connected to the supply of 115 VAC power and is operable to generate a conditioning charge that is provided to the electrical storage 50. The conditioning charge is at a low energy rate (typically about 500 Joules/second) and is used to correct any voltage imbalance of the individual capacitors in the electrical storage 50 during an initial charge sequence.

The ESS 10 includes an emergency stop circuit comprising a plurality of switches 45 connected in series. Each of the power converter unit 14 and the energy storage unit(s) 16 includes one of the switches 45.

As described above, each energy storage unit 16 includes electrical storage 50 that may be comprised of electric double layer capacitors. The capacitors are arranged in a bank comprising one or more strings of series-connected capacitors. The number and arrangement of the strings and capacitors are selected to provide a required voltage. Each capacitor string in the electrical storage 50 is controlled by the universal power controller 20 through a monitoring system 52 associated with the electrical storage 50. The monitoring system 52 collects status signals from the electrical storage 50, optically isolates and buffers them, and then transmits them to the universal power controller 20. The monitoring system 52 also receives control signals from the universal power controller 20 and acts on them to control the connection of the capacitor strings. The status and control signals are transmitted between the monitoring system 52 and the universal power controller 20 via a remote input/out module 54 associated with the monitoring system 52 and the communication module 46 associated with the universal power controller 20 (and the PLC 40).

The control application 32 of the universal power controller 20 anticipates energy conditions approaching lower boundary (LB) and upper boundary (UB) voltage conditions of the energy storage unit(s) 16 and constrains (slows down) the rate of energy transfer between the ESS 10 and the traction power supply 12 as these limits are approached. This decrease in the rate of energy transfer when the boundary conditions are approached improves the regulation of the traction power supply 12 by avoiding abrupt current transitions into the traction power supply 12 that could reduce the operational efficiency thereof. In addition, this slowdown of energy transfer maximizes the total energy capacity of the energy storage unit(s) 16 by compensating for the internal impedance of the electrical storage 50.

If the electrical storage 50 is filled to capacity (during the regeneration mode) or depleted (during the assist mode), the universal power controller 20 stops energy transfer between the energy storage unit(s) 16 and the traction power supply 12.

The control application 32 includes a hybrid control loops 60, 80 (shown in FIG. 4 and FIG. 5, respectively) that anticipates the energy boundary conditions and constrains the rate of energy transfer as the UB and LB limits are approached.

Figure 4:
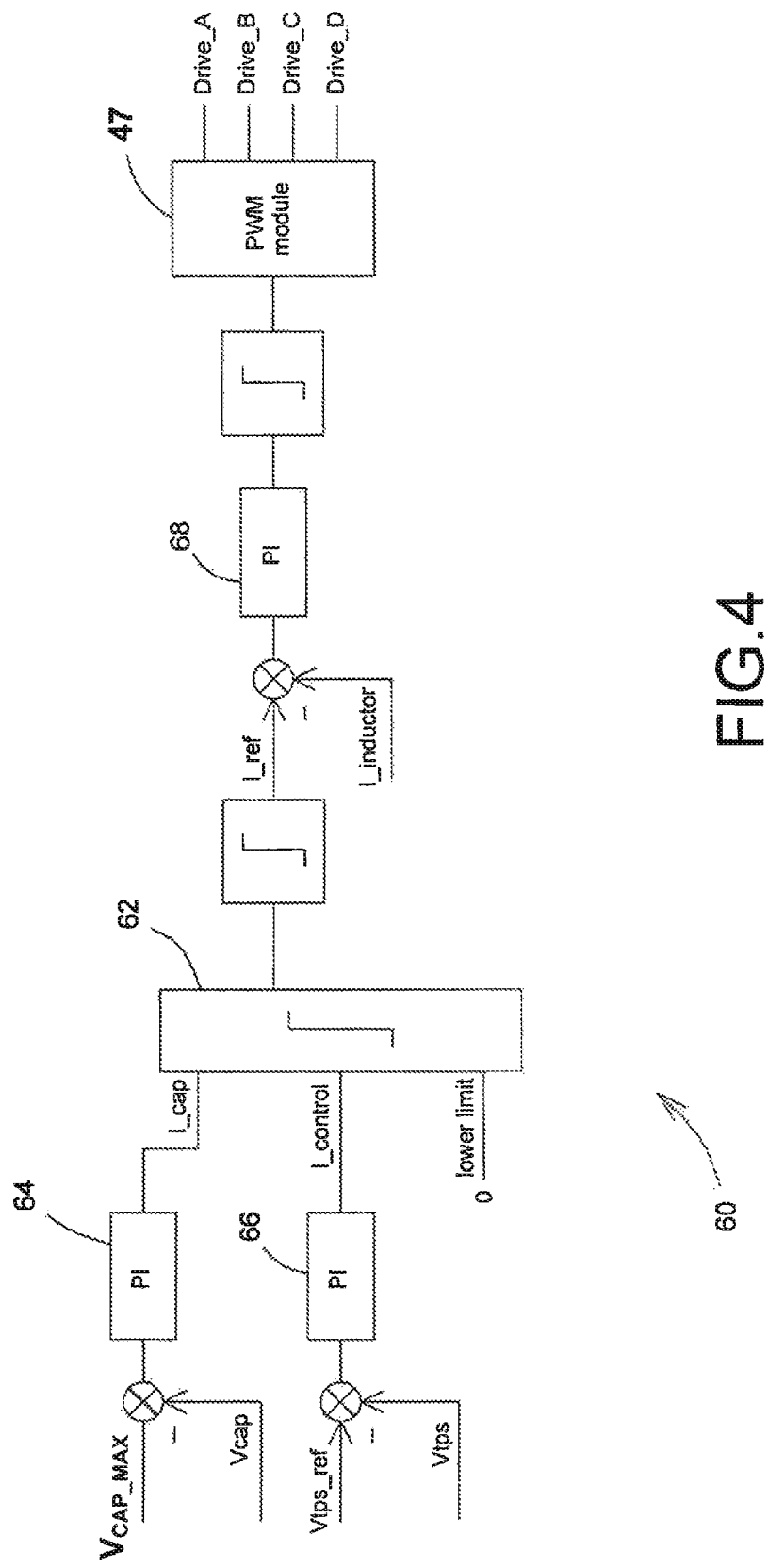
FIG. 4 is a schematic diagram of a first hybrid control loop of the universal power controller of FIG. 3.

Referring now to FIG. 4, the hybrid control loop 60 for the converter 22 includes a proportional-integral controller 66 that works to reduce the difference (error) between the reference voltage level ($V_{TPS\text{-}REF}$) and the voltage level ($V_{TPS}$) of the traction power supply 12 and a proportional-integral controller 64 that works to reduce the difference (error) between the maximum voltage ($V_{CAP\text{-}MAX}$) and the voltage ($V_{CAP}$) of the storage bus 17. The gain of the controller 64 is a function of the capacity of the electrical storage 50. The output ($I_{\_CAP}$) of the controller 64 constrains the use of the output ($I_{\_CONTROL}$) of the controller 66. More specifically, the output ($I_{\_CONTROL}$) of the controller 66 is provided as an input to a dynamic saturator 62, while the output ($I_{\_CAP}$) of the controller 64 is fed to the "up port" of the dynamic saturator 62. The dynamic saturator 62 is operable to bound the range of its input to upper and lower saturation values. When the input is between the upper and lower saturation values, the output of the dynamic saturator 62 is equal to the input. When the input is below the lower saturation value, the output of the dynamic saturator 62 is set to the lower saturation value. When the input is above the upper saturation value, the output is set to the upper saturation value. The upper saturation is value is set by the value provided to the "up port" of the dynamic saturator 62, i.e., the output ($I_{\_CAP}$) of the controller 64. The lower saturation value is set by a "Io port", which is set to zero. The foregoing configuration of the dynamic saturator 62 effectively causes the output of the dynamic saturator 62 to be the lower of the output ($I_{\_CONTROL}$) of the controller 66 and the output ($I_{\_CAP}$) of the controller 64. The output of the dynamic saturator 62 is passed through a limiter to produce a reference current (I_ref). A proportional-integral controller 68 works to reduce the difference between the reference current (I_ref) and the current (I_conductor) of an inductor 37 of the converter 22. The output of the controller 68 is passed through a limiter and then provided to a PWM module 47 of the FPGA 30, which generates PWM signals.

The operation of the hybrid control loop 60 during the regeneration mode of the ESS 10 will now be described. When the train first starts to brake, the positive error between $V_{CAP\text{-}MAX}$ and $V_{CAP}$ is high (and thus I_cap from the controller 64 is high) because the electrical storage 50 is not fully charged. As a result of the braking of the train, the voltage ($V_{TPS}$) of the traction power supply 12 increases and the positive error between $V_{TPS\text{-}REF}$ and $V_{TPS}$ increases. Accordingly, $I_{\_CONTROL}$ from the controller 66 increases and is output from the dynamic saturator 62, which causes the output of the controller 68 to increase the flow of current to the energy storage unit(s) 16. However, when the voltage ($V_{CAP}$) of the storage bus 17 approaches the maximum voltage ($V_{CAP\text{-}MAX}$), the error between $V_{CAP\text{-}MAX}$ and $V_{CAP}$ decreases and, thus, $I_{\_CAP}$ from the controller 64 decreases. As a result, the upper limit of the dynamic saturator 62 becomes limited to a lower $I_{\_CAP}$ from the controller 64, instead of $I_{\_CONTROL}$ from the controller 66, which decreases the rate of transfer of current to the energy storage unit(s) 16.

Figure 5:
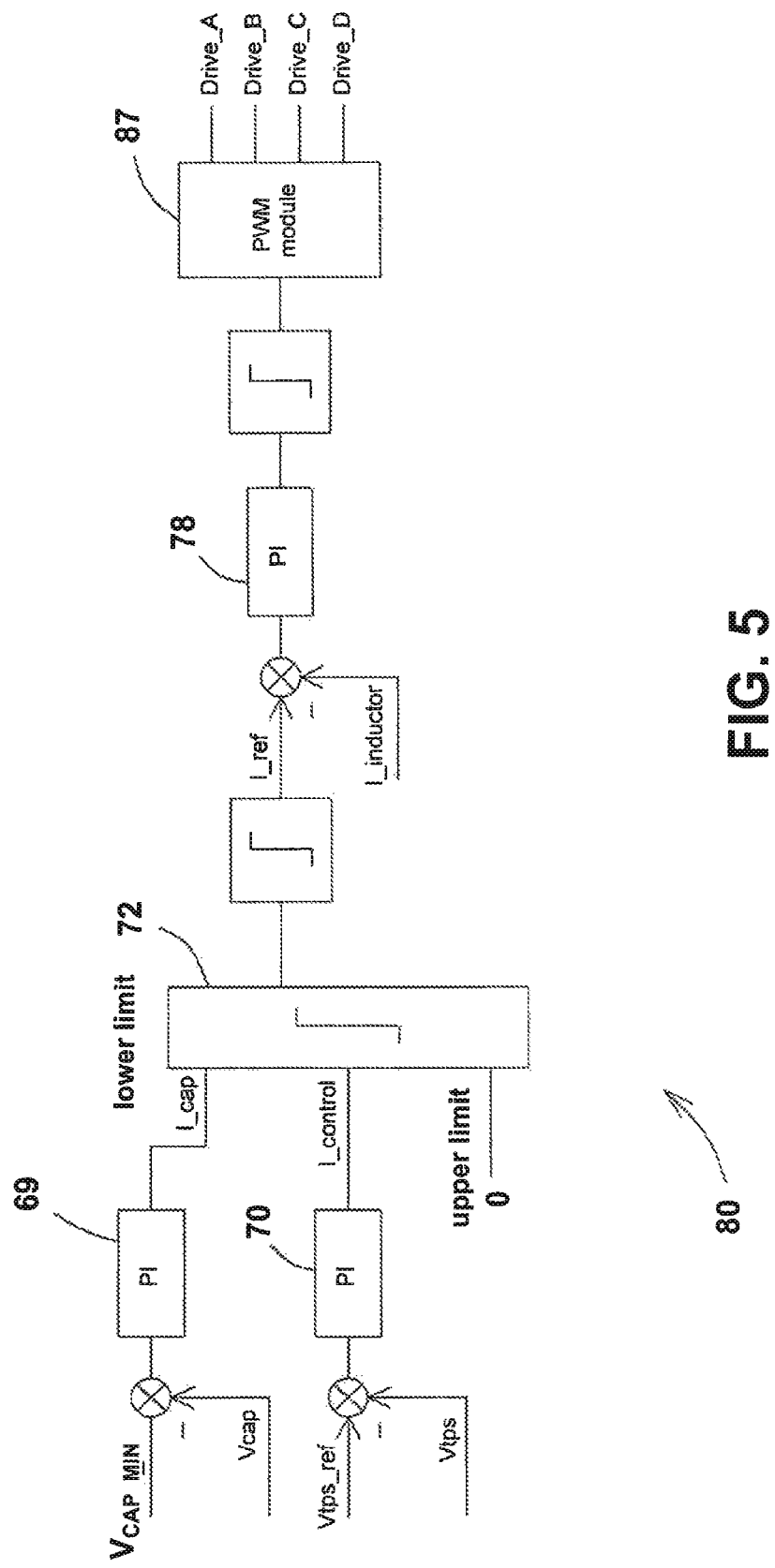
FIG. 5 is a schematic diagram of a second hybrid control loop of the universal power controller of FIG. 3

Referring now to FIG. 5, the hybrid control loop 80 for the converter 22 includes a proportional-integral controller 70 that works to reduce the difference (error) between the reference voltage level ($V_{TPS\text{-}REF}$) and the voltage level ($V_{TPS}$) of the traction power supply 12 and a proportional-integral controller 69 that works to reduce the difference (error) between the maximum voltage ($V_{CAP\text{-}MIN}$) and the voltage ($V_{CAP}$) of the storage bus 17. The gain of the controller 69 is a function of the capacity of the electrical storage 50. The output ($I_{\_CAP}$) of the controller 69 constrains the use of the output ($I_{\_CONTROL}$) of the controller 70. More specifically, the output ($I_{\_CONTROL}$) of the controller 70 is provided as an input to a dynamic saturator 72, while the output ($I_{\_CAP}$) of the controller 69 is fed to the "Io port" of the dynamic saturator 72. The dynamic saturator 72 is operable to bound the range of its input to upper and lower saturation values. When the input is between the upper and lower saturation values, the output of the dynamic saturator 72 is equal to the input. When the input is below the lower saturation value, the output of the dynamic saturator 72 is set to the lower saturation value. When the input is above the upper saturation value, the output is set to the upper saturation value. The upper saturation is value is set by the value provided to the "up port" of the dynamic saturator 72, which is zero. The lower saturation value is set by a "Io port", which is set to the output ($I_{\_CAP}$) of the controller 69. The output of the dynamic saturator 72 is passed through a limiter to produce a reference current (I_ref). A proportional-integral controller 78 works to reduce the difference between the reference current (I_ref) and the current (I_conductor) of the inductor 37 of the converter 22. The output of the controller 78 is passed through a limiter and then provided to a PWM module 87 of the FPGA 30, which generates PWM signals.

The operation of the hybrid control loop 80 during the assist mode of the ESS 10 will now be described. When the train starts to accelerate, the positive error between $V_{CAP\text{-}MIN}$ and $V_{CAP}$ is high (and thus the absolute value of I_cap from the controller 69 is high) because the electrical storage 50 is fully charged. As a result of the starting of the train, the voltage ($V_{TPS}$) of the traction power supply 12 drops and the error between $V_{TPS\text{-}REF}$ and $V_{TPS}$ increases. Accordingly, the absolute value of $I_{\_CONTROL}$ from the controller 70 increases and is output from the dynamic saturator 72, which causes the output of the controller 78 to increase the flow of current from the energy storage unit(s) 16 to the traction power supply 12 (i.e., the train). However, when the voltage ($V_{CAP}$) of the storage bus 17 approaches the minimum voltage ($V_{CAP\text{-}MIN}$), the positive error between $V_{CAP\text{-}MIN}$ and $V_{CAP}$ decreases and, thus, the absolute value of $I_{\_CAP}$ from the controller 69 decreases. As a result, the lower limit of the dynamic saturator 72 becomes limited to a lower $I_{\_CAP}$ (absolute value) as $V_{CAP}$ approaches $V_{CAP\text{-}MIN}$ from the controller 69, instead of $I_{\_CONTROL}$ from the controller 70, which decreases the rate of transfer of current from the energy storage unit(s) 16.

The operation of the ESS 10 when the train is braking will now be described with reference to FIG. 2. When the braking event starts (at t=zero), the voltage $V_{TPS}$ of the traction power supply 12 starts to increase. When $V_{TPS}$ goes above the high threshold HT, the universal power controller 20 enters the regeneration mode and controls the converter 22 to provide current to the energy storage unit(s) 16. As a result, $V_{TPS}$ decreases, i.e., is stabilized. The voltage ($V_{CAP}$) of the storage bus 17 increases until the hybrid control 60 notices that $V_{CAP}$ is approaching its upper boundary voltage condition UB and automatically decreases the energy transfer rate by reducing the current $I_{\_INDUCTOR}$ of the inductor 37, at about 36 seconds in the graphical representation of FIG. 2. In response, $V_{TPS}$ increases slightly. In a train acceleration event (not shown), the universal power controller 20 enters the assist mode to transfer accumulated energy to the traction power supply 12, in which the graphical representation would typically look like a mirror image of the one of FIG. 2, with a negative inductor current $I_{\_INDUCTOR}$, and a decreasing $V_{CAP}$ of the storage bus 17.

When a plurality of ESSs 10 are connected to a single traction power supply 12, current sharing between the power converter units 14 is achieved by droop voltage control.

It should be appreciated from the foregoing that the present invention provides a number of advantages. The ESS 10 includes a hybrid control that ensures optimal energy storage from the traction power supply 12 and energy supply to the traction power supply 12 by slowing down the rate of energy transfer when approaching the maximum capacity (upper boundary voltage condition) and the minimum predetermined storage level (lower boundary voltage condition) of the electrical storage 50, respectively, in order to take advantage of the full practical capacity of the electrical storage 50 and therefore approach the theoretical capacity thereof, which is of a particular interest when dealing with EDLCs.

Yet another advantage of the present invention is that the ESS 10, by limiting the energy transfer rate when approaching either one of the upper and lower boundary voltage condition, prevents any abrupt current transition into the traction power supply 12 that could reduce the operational efficiency thereof.

Still another advantage of the present invention is that the ESS 10 is modular in size (power capacity) and can use different types of energy storage banks, such as electric dual layer capacitors (EDLC), commonly called 'super capacitors', and more conventional chemical batteries such as high capacity lithium-ion batteries, nickel-metal hybrid (NiMH) batteries or the like.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An energy storage system for connection to a traction power supply that provides power to an electric vehicle, the energy storage system comprising:
   (a.) a buck-boost DC-DC converter for connection to the traction power supply;
   (b.) an electrical energy storage;
   (c.) a storage bus connecting the electrical energy storage to the converter; and
   (d.) a power controller communicably connected to the converter and being operable in a regeneration mode when the vehicle is braking and in an assist mode when the vehicle is accelerating;
   wherein when the power controller is in the regeneration mode, the power controller controls the converter to transfer electrical energy from the traction power supply to the electrical energy storage;
   wherein when the power controller is in the assist mode, the power controller controls the converter to transfer electrical energy from the electrical energy storage to the traction power supply; and
   wherein the controller slows the rate of electrical energy transfer between the traction power supply and the electrical energy storage when upper and lower voltage boundary limits of the electrical energy storage are approached, respectively, and
   wherein the power controller comprises
   a first controller that works to reduce the difference between the voltage of the traction power supply and a reference voltage,
   a second controller that works to produce a constraint boundary based on the difference between the storage bus voltage and a maximum bus voltage utilizing a gain of the second controller, and
   a dynamic saturator operable to receive an output from the first controller and to bound the output to upper and lower saturation levels, the upper saturation level being the output of the second controller.

2. The energy storage system of claim 1, wherein the power controller slows the transfer of electrical energy from the traction power supply to the electrical energy storage when the voltage of the storage bus approaches the upper boundary limit; and
   wherein the power controller slows the transfer of electrical energy from the electrical energy storage to the traction power supply when the voltage of the storage bus approaches the lower boundary limit.

3. The energy storage system of claim 1, wherein the electrical energy storage comprises electric dual layer capacitors.

4. The energy storage system of claim 1, wherein the energy storage comprises a plurality of capacitors arranged in one or more strings, each of which comprises a plurality of serially connected capacitors.

5. The energy storage system of claim 1, wherein the energy storage comprises a plurality of batteries.

6. The energy storage system of claim 1, wherein the converter comprises a plurality of insulated gate bipolar transistors (IGBTs).

7. The energy storage system of claim 6, wherein the converter comprises a first leg having a pair of serially connected IGBTs, a second leg having a pair of serially connected IGBTs and an inductor connected between nodes of the first and second legs, the node in each of the first and second legs being located between the IGBTs.

8. The energy storage system of claim 1, wherein the mode of the power controller is determined by a voltage of the traction power supply.

9. The energy storage system of claim 1, wherein the power controller moves to the regeneration mode when the voltage of the traction power supply moves above an upper voltage threshold limit and moves to the assist mode when the voltage of the traction power supply moves below a lower threshold limit.

10. The energy storage system of claim 1, wherein the power controller further comprises a third controller that works to reduce the difference between the current of an inductor of the converter and a reference current derived from an output of the dynamic saturator.

11. The system of claim 1 wherein the gain of the second controller is a function of the capacity of the electrical energy storage.

12. A method of operating an energy storage system, the method comprising:
providing the energy storage system for connection to a traction power supply that provides power to an electric vehicle, the energy storage system comprising a buck-boost DC-DC converter for connection to the traction power supply, an electrical energy storage, a storage bus connecting the electrical energy storage to the converter, and a power controller communicably connected to the converter and being operable in a regeneration mode when the vehicle is braking and in an assist mode when the vehicle is accelerating;
operating the power controller in a regeneration mode such that the power controller controls the converter to transfer electrical energy from the traction power supply to the electrical energy storage; and
operating the power controller in an assist mode such that the power controller controls the converter to transfer electrical energy from the electrical energy storage to the traction power supply; and
wherein the power controller slows the rate of electrical energy transfer between the traction power supply and the electrical energy storage when upper and lower voltage boundary limits of the electrical energy storage are approached, respectively, and
wherein the power controller comprises a first controller that is operated to reduce the difference between the voltage of the traction power supply and a reference voltage, a second controller that is operated to produce a constraint boundary based on the difference between the storage bus voltage and a maximum bus voltage utilizing a gain of the second controller, and a dynamic saturator that operates to receive an output from the first controller and to bound the output to upper and lower saturation levels, the upper saturation level being the output of the second controller.

13. The method of claim 12 wherein the power controller slows the transfer of electrical energy from the traction power supply to the electrical energy storage when the voltage of the storage bus approaches the upper boundary limit.

14. The method of claim 13 wherein the power controller slows the transfer of electrical energy from the electrical energy storage to the traction power supply when the voltage of the storage bus approaches the lower boundary limit.

15. The method of claim 12 wherein the power controller further comprises a third controller that operates to reduce the difference between the current of an inductor of the converter and a reference current derived from an output of the dynamic saturator.

16. An energy storage system for connection to a traction power supply that provides power to a vehicle, the energy storage system comprising:
a DC-DC converter for connection to the traction power supply; an electrical energy storage device;
a bus connecting the electrical energy storage device and the DC-DC converter; and a control system operatively coupled with the converter, the control system comprising a first controller structured to reduce a difference between a voltage of the traction power supply and a reference value to provide a first output, a second controller structured to provide a second output based on a difference between a voltage of the bus and a maximum value of the bus voltage utilizing a gain of the second controller, and a dynamic saturator structured to receive the first output from the first controller and to bound the first output to upper and lower saturation levels, the upper saturation level being dynamically determined using the second output of the second controller;
wherein the control system is operable in a regeneration mode when the vehicle is decelerating to control the converter to transfer electrical energy from the traction power supply to the electrical energy storage device, the control system is operable in an assist mode when the vehicle is accelerating to transfer electrical energy from the electrical energy storage device to the traction power supply, and the control system slows the rate of electrical energy transfer between the traction power supply and the electrical energy storage when upper and lower voltage boundary limits of the electrical energy storage are approached, respectively.

17. The system of claim 16 wherein the first controller is structured as a proportional-integral controller, and the second controller is structured as a proportional-integral controller.

18. The system of claim 16 wherein the control system further comprises a third controller that operates to reduce a difference between the current of an inductor of the converter and a reference current derived from an output of the dynamic saturator.

19. The system of claim 16 wherein the third controller is structured as a proportional-integral controller.

20. The system of claim 16 wherein the gain of the second controller is a function of the capacity of the electrical energy storage device.

* * * * *